(12) United States Patent
Petersen

(10) Patent No.: US 10,202,800 B2
(45) Date of Patent: Feb. 12, 2019

(54) TEMPERATURE-CONTROLLED WINDOW AND METHOD OF CONTROLLING THEREOF

(71) Applicant: SL Holding, Kolding ApS, Oksbøl (DK)

(72) Inventor: Lars Petersen, Kolding (DK)

(73) Assignee: WICURIT APS, Aarhus (DK)

( * ) Notice: Subject to any disclaimer, the term of this patent is extended or adjusted under 35 U.S.C. 154(b) by 474 days.

(21) Appl. No.: 14/397,265

(22) PCT Filed: Apr. 18, 2013

(86) PCT No.: PCT/DK2013/050113
§ 371 (c)(1),
(2) Date: Oct. 27, 2014

(87) PCT Pub. No.: WO2013/159778
PCT Pub. Date: Oct. 31, 2013

(65) Prior Publication Data
US 2015/0122474 A1    May 7, 2015

(30) Foreign Application Priority Data

Apr. 27, 2012 (DK) .................................. 2012 70214

(51) Int. Cl.
*E06B 9/24* (2006.01)
*G05D 23/19* (2006.01)
(Continued)

(52) U.S. Cl.
CPC .................. *E06B 9/24* (2013.01); *E06B 3/67* (2013.01); *E06B 5/00* (2013.01); *E06B 7/28* (2013.01);
(Continued)

(58) Field of Classification Search
CPC ..... E06B 9/24; E06B 3/67; E06B 5/00; E06B 7/28; E06B 2009/2464; G05D 23/1917;
(Continued)

(56) References Cited

U.S. PATENT DOCUMENTS 1,476,116 A * 12/1923 Thompson ............. C08G 69/48
29/618
2,644,065 A * 6/1953 Peterson ........... B32B 17/10018
156/99
(Continued)

FOREIGN PATENT DOCUMENTS

EP    1 715 254 A1    10/2006
GB    2 153 554 A    8/1985
(Continued)

*Primary Examiner* — Travis Ruby
(74) *Attorney, Agent, or Firm* — David S. Safran; Roberts Mlotkowski Safran Cole & Calderon, P.C.

(57) ABSTRACT

The invention concerns a window including a window pane with one or more glass panes, a window frame in which the window pane is provided, at least one temperature sensor arranged in or at the periphery of the window pane, and an electric circuit connected to the temperature sensor mounted on or in the window frame. The electric circuit is configured to be connected to an operation unit which is configured to regulate the incident light through the window pane. The invention furthermore concerns a method for controlling a window wherein the electric circuit controls the means configured to regulate the incident light through the window pane based on a set of parameters. The parameters are determined on the basis of the orientation and geographical position of the window whereby the supply of free energy is optimized and the amount of energy supplied from energy sources in the room is reduced. In an embodiment the window can be controlled by means of an application configured to run on a mobile communication unit.

14 Claims, 3 Drawing Sheets

(51) Int. Cl.
*E06B 3/67* (2006.01)
*E06B 5/00* (2006.01)
*E06B 7/28* (2006.01)
*H05B 1/02* (2006.01)

(52) U.S. Cl.
CPC ....... *G05D 23/1917* (2013.01); *H05B 1/0275* (2013.01); *E06B 2009/2464* (2013.01)

(58) Field of Classification Search
CPC ....... H05B 1/0275; G02F 1/153; G02F 1/163; F28F 21/006; F28F 2200/00; F24F 2221/20; F24D 13/026
USPC .................................................. 165/287, 47
See application file for complete search history.

(56) References Cited

U.S. PATENT DOCUMENTS

| | | | | |
|---|---|---|---|---|
| 3,020,376 | A * | 2/1962 | Hofmann | B32B 15/08 156/106 |
| 3,710,074 | A * | 1/1973 | Stewart | B32B 17/10055 219/203 |
| 3,789,192 | A * | 1/1974 | Spindler | B32B 17/10036 219/203 |
| 3,902,040 | A * | 8/1975 | Ikeda | G01N 27/048 200/61.05 |
| 4,127,765 | A * | 11/1978 | Heaney | A47F 3/0434 219/218 |
| 4,306,140 | A * | 12/1981 | Stromquist | H05B 3/84 219/203 |
| 5,285,315 | A * | 2/1994 | Stiles | E06B 9/24 359/592 |
| 5,331,823 | A * | 7/1994 | Matsuoka | B60H 1/00007 454/93 |
| 5,379,146 | A * | 1/1995 | Defendini | B60R 1/088 359/265 |
| 5,598,000 | A * | 1/1997 | Popat | E06B 9/32 250/205 |
| 6,039,390 | A * | 3/2000 | Agrawal | B32B 17/10036 296/211 |
| 6,098,893 | A | 8/2000 | Berglund et al. | |
| 6,144,017 | A * | 11/2000 | Millett | F25D 21/02 219/203 |
| 6,369,935 | B1 | 4/2002 | Cardinal et al. | |
| 7,246,470 | B2 * | 7/2007 | Beyrle | H05B 3/84 219/213 |
| 7,548,833 | B2 * | 6/2009 | Ahmed | F24F 11/0086 702/130 |
| 8,180,491 | B2 | 5/2012 | Reid et al. | |
| 8,483,850 | B2 | 7/2013 | Stachler | |
| 2004/0185195 | A1 * | 9/2004 | Anderson | B32B 17/10036 428/34 |
| 2005/0166495 | A1 | 8/2005 | Cho et al. | |
| 2005/0278047 | A1 * | 12/2005 | Ahmed | F24F 11/0086 700/97 |
| 2006/0081584 | A1 * | 4/2006 | Gaskell | E04B 1/7608 219/213 |
| 2007/0053053 | A1 * | 3/2007 | Moskowitz | E06B 9/24 359/296 |
| 2007/0242174 | A1 * | 10/2007 | Maisuradze | G02F 1/133 349/16 |
| 2008/0280078 | A1 * | 11/2008 | Krisko | B32B 17/06 428/34 |
| 2009/0254222 | A1 * | 10/2009 | Berman | E06B 9/322 700/275 |
| 2009/0301008 | A1 * | 12/2009 | Petersen | E06B 1/38 52/204.593 |
| 2011/0066302 | A1 * | 3/2011 | McEwan | F24F 11/006 700/295 |
| 2011/0133940 | A1 * | 6/2011 | Margalit | E06B 3/66366 340/584 |
| 2011/0164306 | A1 * | 7/2011 | Shim | C03C 17/06 359/289 |
| 2012/0033287 | A1 * | 2/2012 | Friedman | C03C 17/34 359/275 |
| 2012/0239209 | A1 * | 9/2012 | Brown | H04L 12/2803 700/278 |
| 2013/0063065 | A1 * | 3/2013 | Berman | H04L 12/2827 318/480 |
| 2013/0125505 | A1 * | 5/2013 | Stumm | E06B 1/325 52/783.1 |
| 2013/0242370 | A1 * | 9/2013 | Wang | G02F 1/163 359/275 |
| 2013/0271814 | A1 * | 10/2013 | Brown | G02F 1/163 359/275 |
| 2014/0303788 | A1 * | 10/2014 | Sanders | F24F 11/0009 700/276 |
| 2014/0327949 | A1 * | 11/2014 | Gross | E06B 9/24 359/244 |
| 2015/0116811 | A1 * | 4/2015 | Shrivastava | G08C 17/02 359/275 |
| 2016/0203403 | A1 * | 7/2016 | Nagel | H04L 51/32 706/61 |

FOREIGN PATENT DOCUMENTS

| | | |
|---|---|---|
| GB | 2 212 949 A | 8/1989 |
| JP | 2-161091 A | 6/1990 |
| JP | 10-184236 A | 7/1998 |
| WO | 2007/061357 A1 | 5/2007 |

\* cited by examiner

TEMPERATURE-CONTROLLED WINDOW AND METHOD OF CONTROLLING THEREOF

BACKGROUND OF THE INVENTION

Field of the Invention

The present invention concerns a method for regulating the indoor climate in at least one room in a building, comprising:

at least one first unit configured to supply energy from an energy source to the room;

at least one second unit connected to the first unit and controlling the energy supply from the first unit based on at least one measured temperature, where control of the energy supply from the first unit is performed on the basis of on one or more sets of parameters;

at least one third central unit configured to communicate with the second unit, wherein the method includes the following steps the third unit generates the set of parameters based on one or more sets of data describing the external, ambient conditions that influence the indoor climate, for example meteorological data for a geographical area in which the first unit is located.

Description of Related Art

The present invention also concerns a window, including:

at least one window pane including one or more glass panes made of a transparent material;

at least one window frame in which the window pane is disposed;

at least one temperature sensor arranged at the periphery of the window pane;

an electric circuit connected to the temperature sensor and which is configured to generate a control signal when the measured temperature from the temperature sensor is equal to or greater than at least one reference temperature, and wherein the electric circuit is configured such that it can be connected to means that are configured to regulate the indoor climate in a room in which the window is located.

Presently there is an increased focus on energy consumption in houses in connection with new construction and with renovation of existing houses. Today there are greater demands on the insulating ability in new houses and on energy optimisation of existing houses, in particular thermal loss through walls and doors/windows, as well as control of the total energy consumption in the houses.

Different systems (also called building management systems) for controlling and monitoring the energy consumption in the building, including temperature control, are described in the literature.

JP 10184236 A discloses a system for controlling the indoor temperature in houses which by means of a skylight including an LCD layer and an outdoor temperature sensor regulates the amount of incident light through the window. The temperature sensor is connected to a controller which based on the measured temperature regulates the voltage applied on the electrodes connected to the LCD layer, whereby the light transmittance of the window is regulated and the temperature rise in the room is reduced.

The system has the disadvantage that the temperature is measured outside and not inside the room whereby the temperature sensor is heated more quickly than the room. The control of the LCD layer is thereby dependent on the incident angle and direction of the light for performing correct control of the temperature in the room. Thus there is a risk that the LCD layer is activated too early or too late in relation to the desired temperature in the room.

JP 2161091 A discloses a similar system which uses a temperature sensor disposed in the room and a temperature regulator for regulating light transmittance in a skylight. The controller compares the measured temperature with a reference temperature and activates a voltage regulator connected to the LCD layer in the window when the temperature exceeds the reference temperature.

The system has the disadvantage that the temperature sensor measures a point in the room, typically close to the floor or at a wall, implying that the temperature may vary at other points in the room if the case is a relatively large or long room. If the temperature sensor is not disposed at an optimal location in the room the system will furthermore not perform a correct regulation of the temperature in the room.

US 2005/0166495 A1 discloses a window with a temperature sensor disposed at the internal side of the window where the sensor is connected to a controller integrated in the window frame. The controller activates a heating wire arranged along the periphery of the interspace between the glass panes if the measured temperature exceeds a pre-set reference temperature. U.S. Pat. No. 6,369,935 B1 discloses a window with an electrochromic layer arranged between two glass layers. The electrodes from the electrochromic layer is connected to a separate controller disposed close to the window and controlling the light transmission through the electrochromic layer by means of a temperature sensor integrated in the spacer or in the glue joint close to one of the glass panes.

By using a sensor disposed at a single point on the window pane there is not provided a true indication of the temperature changes in the window or the incident light through the wind as the measured value will depend on the direction and angle of the sunlight. Also, the system will be slow to react to changes in temperature as the reaction time will depend on the position of the sensor in relation to the light incidence.

Various solutions for control and programming of the energy supply to a room in a building are described in the literature in addition to the above mentioned solutions. An electronic room thermostat from the company Danfoss A/S is an example of such a solution where the room thermostat wirelessly controls the energy supply from a radiator based on a room temperature measured by a temperature sensor in the room thermostat. The room thermostat can control the temperature in the room based on various programmable settings. Another example of such a solution from the same company is a touch screen or control unit in a building management system which is wirelessly connected to one or more radiator thermostats located in different rooms, where the setting of each thermostat can be programmed/controlled by means of the control unit.

GB 2153554 A discloses a control method for regulating the temperature inside a building having a central heating system controlled by a central controller. The controller controls the activation of the central heating system based on the meteorological forecast data. EP 1715254 A1 discloses a similar control method where the controller controls a heating system integrated in the floor of the room based on the meteorological forecast data.

All of the above solutions describe solutions in which the control of energy supply is performed based on a number of manually entered parameters, such as reference temperatures and time intervals. This manual programming of the radiator thermostats is both tedious and time-consuming. None of the above mentioned solutions indicate a solution wherein control of the energy supply is adapted to external conditions from outside that influence the energy supply, such as the weather in the geographical area in question or the compass direction in which the thermostat and the associated window are facing.

SUMMARY OF THE INVENTION

The object of the present invention is to provide a window that intends to solve the problems of the prior art in a more simple and thereby less costly way.

The object of the present invention is to provide a window which can be implemented as an integrated solution without using external apparatuses.

The object of the present invention is to provide a window which registers temperature at the spot where the temperature fluctuations are the greatest in a window.

The object of the present invention is to provide a window which has a short reaction time to measured changes in temperature.

The object of the present invention is to provide a control of an intelligent window wherein the control is adapted to the position of the window.

The present invention provides for solving the problems of the prior art by providing a method for regulating the indoor climate in at least one room in a building, characterised in that the geographical position of the first unit is determined and transmitted to the third unit, based on which position the third unit determines the sets of parameters.

Control and programming of the energy supplying unit can hereby be adapted to outdoor conditions influencing the indoor climate, e.g. the geographical area in which the unit is located. Previously, control has only been performed in relation to indoor parameters in the indoor climate, such as the type of room and the room temperature. The central unit may advantageously be a central server which can communicate with an external server or database including one or more sets of historical meteorological data for one or more geographical areas. The meteorological data can include information about temperature conditions, wind conditions, precipitation, air pressure, hours of sunshine or other climatic data and/or observation data for the geographical areas. By using meteorological data, the programmable parameters according to which the energy supplying unit is controlled are adjusted to the weather in the area in question. Several parameters can hereby be adjusted automatically whereby the need for manual programming and adjustment of the parameters is reduced. The method can advantageously be used for controlling and programming an intelligent window including means for regulating the incidence of light from energy sources such as the sun and/or lighting units, wherein the means are controlled on the basis of the generated parameters. The method can furthermore be used for programming and controlling other energy sources such as heating units, ventilation units, cooling units and/or circulation units intended for supplying energy to the air or to circulate/change the air in the room or building, wherein the units are controlled by a thermostat, e.g. an electric thermostat or an intelligent window with built-in thermostat function.

The geographical position of the window can hereby be determined and transmitted to the central server which then can retrieve the meteorological data for the area in question. The geographical position of the window can be determined by means of a position module in the window in the form of a GPS module or a module configured to triangulate the radio signals from two or three antennas/sending masts. The geographical position can be determined by means of the functions in a mobile communication unit in the form of a mobile phone, a PDA, a tablet or other mobile communication unit, e.g. by means of a GPS module or other position-based service. The mobile communication unit can communicate with the central server via a mobile data network and/or with the window via a local data network.

In an embodiment of the invention, the compass direction of the first unit is determined and transmitted to the third unit, based on which compass direction the third unit determines the sets of parameters.

The compass direction of the window is determined and transmitted to the central server which then can adjust the parameters according to whether the window is facing south, north, west, east or other compass direction. The compass direction can be determined by means of a directional module in the window including a digital compass with two or three magnetic field sensors or a GPS receiver with two or three antennas. The compass direction can be determined by means of the functions in the mobile communication unit, e.g. by means of the GPS module, an electronic compass in the phone or a compass service. The position and the compass direction of the window can be combined with the meteorological data in a processor in the server where the server generates one or more sets of parameters by which the functions in the window are controlled during normal operation. The control of the window can hereby be optimised to its position and the weather in the geographical area, implying that more free energy can be conducted/supplied into the room from outside (from the sun) and the amount of energy from energy sources in the room can be reduced.

Geometrical data in the form of a plan drawing of the building and/or the external geometrical shape of the building can be stored in central server. The geometrical data can be used for determining the sets of parameters by which the window is controlled. Hereby, the surrounding building components, such as eaves, other windows, projections on the building or other relevant conditions, can be taken into account. Other data such as air quality (degassing level, $CO_2$ concentration, smog, ozone etc.), room type (office, canteen, classroom etc.), light conditions (path of sun relative to the room/window) and/or choice of material (U/G/L/Psi-values for the window and the wall around the window) can be stored in the server and used for determining the parameters. All the data can be used for determining the parameters stored on the server so that only the sets of parameters are transferred to the window. The parameters can be determined from any type of data or a combination thereof. The loss of energy in the building/room and external conditions such as smog and the like can hereby be taken into account, thus achieving a better and more optimal control of the energy supply.

In an embodiment according to the invention, the second unit communicates with a mobile communication unit or local control unit which in turn communicates with the third unit.

The window can hereby communicate with the central server via a mobile data network or via a wireless internet connection in the mobile communication unit. This can take place either instead of or as a supplement to the directly wired or wireless connection between the window and the central server. The mobile communication unit may again communicate with the window via a local data network generated by either the communication module in the window or a communication module in the unit. The communication module in the window can be designed as a WIFI module, a WLAN module, a Bluetooth module, an IR module, an NFC module, or another wireless communication module. The position module and the direction module in the window can be omitted so that the number of components in the window and the production costs are reduced. The window may instead communicate with a local control unit in the form of an operating panel including at least one display, or in the form of an external controller in a building management system via the local data network. The controller/operating panel may in turn communicate with the central server via a wired or wireless internet connection. The functions in the window can hereby be controlled by means of an operating panel provided on e.g. a wall, or communicate with a building management system which can transmit and receive data from the window and possibly control the window.

In an embodiment according to the invention, the energy supply from the first unit is controlled by means of an application configured to run on the mobile communication unit.

The functions in the window can hereby be controlled by means of an application in the mobile phone where the application can be downloaded on the mobile phone via a homepage, e.g. stored on the central server. The application may communicate with the window by means of the wireless communication in the window. The application can be designed to control the functions in the window by means of one or more graphic user interfaces that may be arranged in the application or managed by the server. One or more of the graphic user interfaces can be designed to visually indicate one or more of the measurements performed in the window via text or graphics. The shown measurements can be the temperature $T_m$ and/or $T_r$, the air pressure, light index or another measurement. The user can perform adjustment of one or more parameters by which the window is controlled. The operating panel in the window can hereby be omitted so that the number of components in the window and the production costs are further reduced.

In an embodiment according to the invention, the first unit is a window where one or more means regulating the amount of incoming light through the window is/are arranged in or close to the window and that the second unit is an electric circuit measuring at least one temperature and controlling the means based on the set of parameters.

The described method can hereby be used for controlling an intelligent window based on the meteorological data characterising the weather in the geographical area in which the window is located. Moreover, control of light incidence through the window pane can be adapted to the position of the window on the building. The supply of free and green energy from the ambient surroundings (sun) can hereby be controlled and optimised such that the window remains transparent/translucent for a longer time whereby the amount of energy from the energy sources in the room can be reduced.

In an embodiment according to the invention, the first unit is a heating unit provided in the room, and that the second unit is a window comprising a control unit controlling the amount of energy supplied from the heating unit based on the set of parameters.

The present invention intends to solve the problems of the prior art by providing a window which is characterised in that the temperature sensor is designed as a line sensor detecting the temperature along a line along at least part of the periphery of the window pane, and that means are configured to regulate the indoor climate as described above.

Hereby is provided a window that measures the temperature at the point on the window where the heat flow and thereby the temperature fluctuations in the window are the greatest. Thereby a more accurate detection of the temperature in the window can be performed whereby a better regulation of the light incidence, the temperature and thereby the energy supply to the room can be performed. Moreover, there is provided a window which functions as an independent unit which does not need to be connected to other external units, such as thermostats, temperature sensors or controllers, in order to measure and regulate the temperature in the room. In its simplest form, the window can function as a window with integrated thermostatic function. The window can include two, three, four or more panes arranged in a window frame wherein the panes are separated by a number of intermediate frame members. The temperature sensor can be arranged along one or more of the panes.

The temperature can hereby be measured along the entire periphery of the pane or a predetermined part thereof such that the temperature sensor also can detect when the sunlight only falls on part of the window. This provides that the window can detect the heat flow through the window irrespective of where the sunlight falls on the window; the window can hereby also detect even small heat flows. This implies that the window can regulate the light incidence or the temperature in the room as early when the sunlight starts to fall on the window and not just when the sunlight falls on the sensor. The window frame can advantageously be made of a material with high thermal conductivity so that the temperature sensor measures across a large temperature range and more easily can detect the temperature fluctuations. By measuring the temperature with a single sensor extending along the periphery/circumference of the window pane, an expression (mean value) for the temperature as perceived over the entire window can be determined.

In a specific embodiment according to the invention, at least one first temperature sensor is arranged along a first part of the periphery of the window pane, and one second temperature sensor is arranged along a second part of the periphery of the window pane, wherein both temperature sensors are connected to the electric circuit.

The window can hereby be divided into a number of sections where the temperature in each section is determined by means of a sensor extending along a specific section of the window. The temperature in the window can then be determined from the temperature in the different sections. Four sensors extending along the periphery of the top member, bottom member and side members, respectively, can be arranged in the window, where an expression of the temperature in the window can be determined as the average of the four measured values. Alternatively, one or two sensors can be arranged along one of the sections and extend a length in over another of the sections.

In an embodiment according to the invention, the temperature sensor is disposed in a first sealing in the window pane or in a joint arranged between the window pane and the window frame. In a particular embodiment, at least one second temperature sensor is disposed in at least one second sealing.

The control unit can hereby determine which way the heat flows through the window whereby the heat loss and the heat supply, respectively, can be determined. A more optimal regulation and control of the energy sources and the actuators in the room, such as the radiators, the floor heating and the ventilation in the room, can be performed. The heat loss and the heat supply can also be used for determining and optimising the energy consumption in the building. Moreover, it is possible to use the outermost or the innermost temperature sensor as a reference sensor, eliminating the need for another separate reference temperature sensor.

In an embodiment of the invention, the electric circuit includes a control unit configured to control an operation unit via the control signal, and wherein the operation unit is configured to regulate the indoor climate in a room in which the window is located.

The window can hereby be connected to an operation unit that regulates the indoor climate in the room based on measurements performed at the point where the temperature fluctuations are the greatest. Furthermore, the control unit can perform a stepwise/gradual regulation of the light incidence/energy supply as the temperature rises in the room; it is possible hereby to prevent too large variations in the temperature in the room. This allows seeing out of the window for a longer time simultaneously with the light incidence is attenuated. The operation units may advantageously be controlled on the basis of one or more sets of programmable parameters which are possibly adapted to the geographical location of the window and thereby the weather in the area in question, orientation of the window, the geometrical shape of the building and/or other data like air quality and type of room. The window can be used as a thermostat connected to an energy source provided in the room, e.g. a heating unit in the form of a radiator or heat exchanger, where the control unit in the window controls the amount of energy supplied from the energy source based on the generated parameters. The operation unit can be designed as a ventilation unit and/or cooling unit, e.g. disposed in the window frame where the opening/closing of the damper or activation of a valve is controlled by the control unit based on the temperature measurement and/or a $CO_2$ measurement. The air in the room can hereby be replaced by fresh air from outside. The control unit can be connected to a circulation unit and/or lighting unit wherein the circulation of the air in the room or control of the light is performed based on the generated parameters.

In a particular embodiment of the invention, the operation unit is mounted at or in the window frame and is connected to either a light transmitting layer arranged in the window pane or a sunshade connected to the window.

Hereby, the installation of the window can be simplified as it is not necessary to connect the window to an external control unit for controlling the light incidence or the temperature in the room. Moreover, the control unit and possibly the operation unit can be hidden inside the frame, e.g. via a removable cover, such that they do not interfere with the aesthetical appearance in the room. Also, the window can operate independently of other units as all electronics are mounted on or in the window frame. The window can thereby independently regulate the temperature or the light incidence based on input from own sensors arranged in or at the window.

In an embodiment of the invention, the controller is connected with an operating panel and/or a wireless communication module which is configured to communicate with an external apparatus or at least a second window.

The user can hereby perform a manual adjustment or control of the functions in the window, such as setting the reference temperature or choosing different program options. The operating panel can advantageously show the measured temperature or other parameters/options which the user then can select/adjust via one or more buttons/switches. Also, it is possible to control the window by means of the wireless connection, either via a remote control or a building management system. Together with a control signal, the measured temperature can advantageously be transmitted to the building system which determines how much natural/free energy is supplied to the room from outside, and possibly subsequently adjust the amount of energy transferred from the energy sources to the energy sources in the room. It is hereby possible to reduce the total energy consumption in the room and thereby in the building.

A first communication module can be configured to communicate with a central server via a wireless or wired internet connection. A second communication module can be configured to communicate with a building management system and/or at least a second intelligent window. The window can hereby operate as a master unit controlling at least a second intelligent window which can function as a slave unit. The window can include a position module in the form of a GPS module connected to the electric circuit. The window can include a direction module in the form of a digital compass that may include two or three magnetic field sensors or a GPS receiver with two or three antennas. The direction module can alternatively be integrated or built into the position module. The position and the compass direction of the intelligent window can advantageously be used for determining the parameters by which the intelligent window is controlled.

In an embodiment of the invention, a temperature regulating element is arranged at the periphery of the window and in direct or indirect thermal contact with a joint arranged between the window and the window frame. In a particular embodiment of the invention, the temperature sensor and the temperature regulating element are designed as one and the same element.

The temperature regulating element can hereby be used for preventing condensation formation at the inner side of the window by heating the window frame and thereby the periphery of the window as well, e.g. to 20° C. or to a temperature over the dewpoint temperature. Activation of the temperature regulating element may advantageously be combined with measurements from other sensors, e.g. an external or internal temperature sensor, air humidity sensors or similar.

In an embodiment of the invention, at least one other type of sensor, such as a light sensor, an air pressure gauge and/or a vibration meter, is arranged in or at the periphery of the window pane and connected to the electric circuit.

The electric circuit may advantageously be connected to at least one second type of sensor disposed at the outer or inner side of the pane/window. A light sensor in the form of a LUX-sensor or a PIR sensor can be connected to the electric circuit, and the window can hereby remain transparent, even on an overcast day with high temperatures or as long as daylight persists. An air pressure gauge in the form of a barometer can be connected to the electric circuit so that the window can remain transparent even on days with thunder where high temperatures are experienced simultaneously with an overcast sky, or by the encounter between a low pressure and a high pressure. At least one vibration sensor in the form of a strain gauge, a piezoelement, a shock sensor or an accelerometer can be connected to the electric circuit. Input from this sensor can hereby be used in connection with burglar alarm or in connection with a condition monitoring of the window. If the window pane is smashed/destroyed it can, for example, be detected as a sudden and distinctive change in the measured parameters. This condition monitoring can be used for performing a service life estimation, e.g. based on expansions and contraction based on the measured values as the latter can provide an indication as to when it is necessary to replace the assembly. A $CO_2$ meter can be arranged in the window frame for ventilating the air in the room by means of a ventilation unit.

The invention is described in the following with reference to the drawing, wherein:

DETAILED DESCRIPTION OF THE INVENTION

In the explanation of the Figures, identical or corresponding elements will be provided with the same designations in different Figures. Therefore, no explanation of all details will be given in connection with each single Figure/embodiment.

By the term "energy source" is meant any kind of energy source or unit configured to the active or passive transfer of positive energy for heating or negative energy for cooling the room or building. The term "energy source" also includes a unit configured to circulate the air internally of the room or to mix the air with air from another room or from outside wherein the energy from the warm air is transferred to the cold air. By the term "energy" is meant any kind of energy occurring in a room or a building, e.g. thermal energy in the form of heat, light energy in the form of artificial light and sunlight, radiation energy in the form of heat radiation, and other forms of energy.

Figure 1:
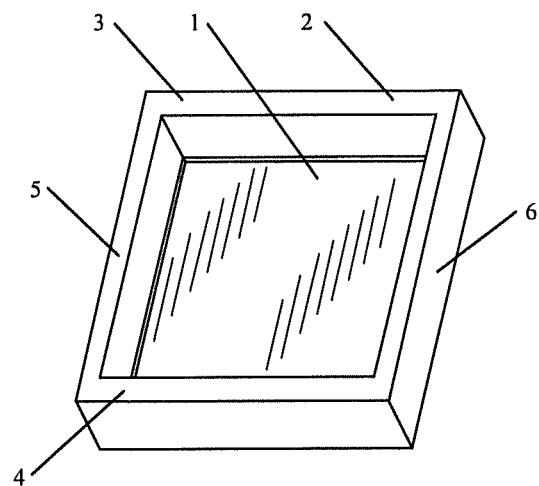
FIG. 1 shows a simplified layout of the window according to an embodiment of the invention.

FIG. 1 shows a simple layout of the window according to the invention including at least one window pane 1 mounted in at least one window frame 2. The window pane can include one, two, three or more layers 8, 9 in the form of glass panes made of a transparent and approximately rigid material such as glass, plexiglass or other suited material.

The window frame 2 in the shown embodiment is designed as a four-sided window including a top member 3 and a bottom member 4 connected with two side members 5, 6. The window frame 2 can be made of aluminium, wood, PVC, composite or other suited material and can be designed as a hollow or solid window frame. The window pane 1 can be divided into one or more sections (not shown) where the glass panes 8, 9 in the individual sections may be divided by an intermediate frame member connection to at least one of the members 3, 4, 5, 6.

Figure 2:
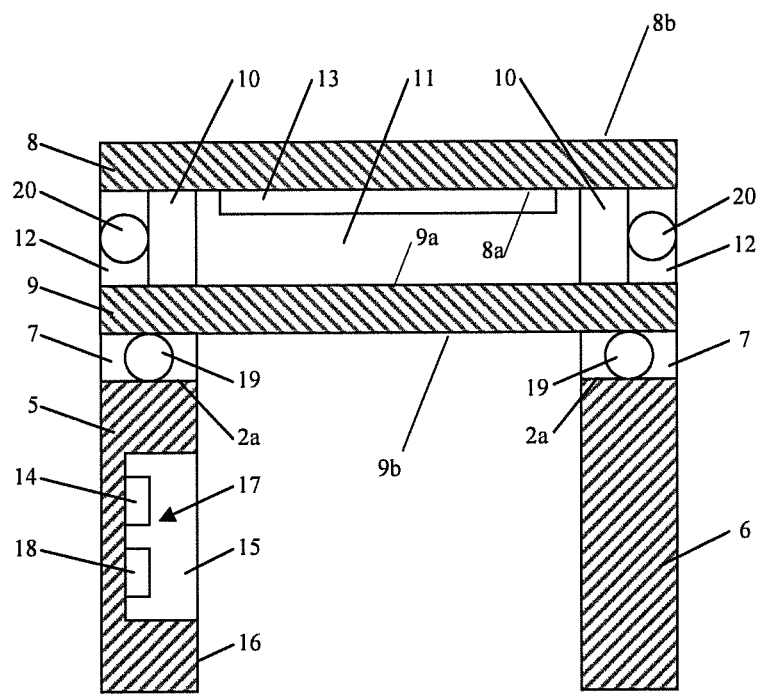
FIG. 2 shows a cross-section of a first embodiment of the invention shown on FIG. 1.

FIG. 2 shows a cross-section of a first embodiment according to the invention wherein the window pane 1 is connected to an end face 2a on the window frame 2 via a joint 7. The joint 7 can be a glue joint, a rubber joint or other suitable joint configured to retain the window pane 1 in the window frame 2. In this embodiment, the window frame 2 is designed as a narrow window frame. The window pane 1 can include two, three or more glass panes 8, 9 separated by a number of spacers 10 such that the glass panes 8, 9 and the spacers 10 together form a cavity 11. The cavity 11 along the edge of the glass panes 8, 9 can be sealed by means of silicone, elastic joint filler or other suitable sealing material 12. The cavity 11 can be filled with a gas such as krypton, argon, air or other suitable gas.

A layer of light-transmitting material 13 such as electrochrome, fluid crystals (called LCD), thermochrome, window film, sunfilm, UV-film, or other suitable material can be provided at the inner side 8a of the glass pane 8. Alternatively, the light transmitting material 13 can be provided at the outer side 9b of the glass pane 9. The light transmitting layer 13 can be designed as one whole section or several sections that all can be connected to an operation unit 14. The light transmitting layer 13 can be configured such that its light transmittance (called LT) and/or other energy transmittance (called G-value) is changed at a given temperature, voltage or other type of energy supplied via the operation unit 14. Alternatively, at the outer side of the window pane 1 there may be arranged a sunshade (not shown) in the form of a Venetian blind, lamellae, panels, a curtain, an awning or other suitable arrangement. The sunshade can be connected to the operation unit 14 which can activate the sunshade and/or operate the functions in it.

The operation unit 14 can be configured to activate the light transmitting layer 13 and/or the sunshade, e.g. by changing the polarity of the material or by supplying energy in the form of heat or a voltage. The operation unit 14 can be mounted on or in the window frame 2, preferably in one side member 5, 6. The window frame 2 can include a cutout 15 or a closed housing (not shown) in one side face 16 in which the electric circuit 17 is arranged. The operation unit 14 can be connected to the electric circuit 17 and controlled by means of the electric circuit 17. The operation unit 14 can be arranged in the cutout 15 together with the electric circuit 17.

The electric circuit 17 includes a control unit 18 which may include a microprocessor which in turn is connected to at least one temperature sensor 19 arranged along the periphery of the window 1. The control unit 18 can be configured to compare the measured temperature $T_m$ from the temperature sensor 19 with at least one reference temperature $T_r$. If the measured temperature $T_m$ is equal to or greater, the control unit 18 generates a control signal that activates the operation unit 14. The reference temperature $T_r$ can be measured by means of at least one secondary temperature sensor (not shown) which may be disposed inside the room, outside close to the window and/or in the cutout 15 together with the electric circuit 17.

In a particular embodiment, the control unit 18 can compare the measured temperature $T_m$ with a number of reference temperatures $T_r$ on the basis of which the operation unit 14 can perform a stepwise/gradual operation of the light transmitting layer 13 and/or the sunshade. The stepwise/gradual operation is defined as being a percentage graduation of the maximum energy supply or light/energy transmittance, e.g. 0%, 50%, 100% or any other graduation there between.

In a particular embodiment there are two, three or more temperature sensors 19, 20 arranged at the periphery of the window pane 1. The temperature sensors 19, 20 are disposed in each their sealing 12 between the individual glass panes 8, 9. Alternatively, one temperature sensor 19 can be provided in the joint 7, 22 between the window pane 1 and the window frame 2 while the other temperature sensors 20 can be distributed in the sealing 12 between the individual glass panes 8, 9.

Figure 3:
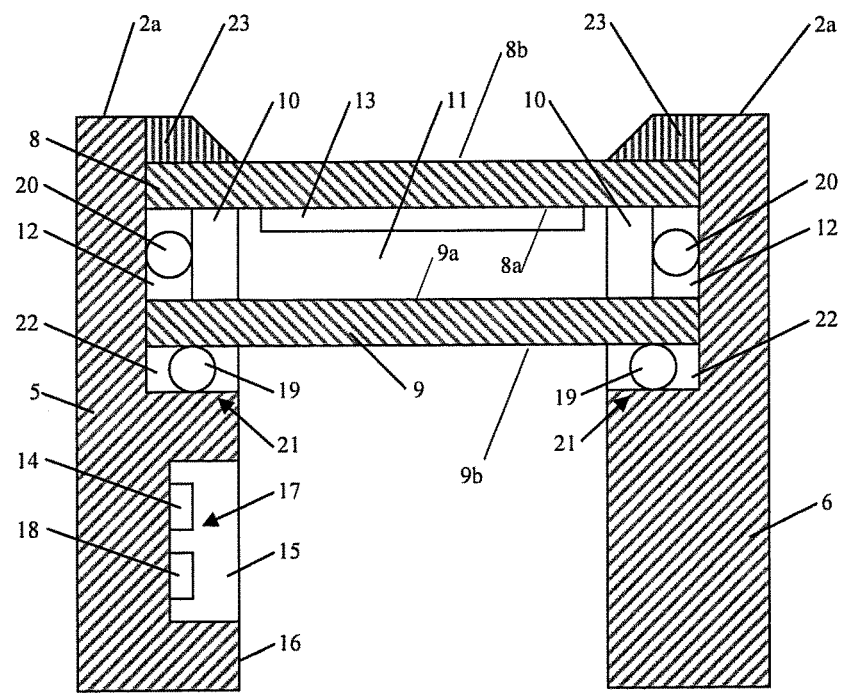
FIG. 3 shows a cross-section of a second embodiment of the invention shown on FIG. 1.

FIG. 3 is a cross-section of a second embodiment according to the invention which differs from the cross-section in FIG. 2 in that the pane 1 is disposed in cutout 21 in the form of rabbet on the window frame 2. In this embodiment, the window frame 2 is designed as a wide window frame in which the rabbet can be formed along the inner side face 16 and the end face 2a of the window frame 2.

In this embodiment, the window pane 1 can be provided on a number of spacer blocks (not shown) in the bottom member 4, wherein along the periphery of the inner side 9a of the window pane 1 there may be provided a second joint 22 in the form of a rubber band, an elastic joint filler or other suitable joint. The window pane 1 can be retained in the rabbet 21 by means of an edge profile 23 which can be disposed at the outer side 8b of the window pane 1 and can include a joint (not shown) facing the joint 22.

Figure 4:
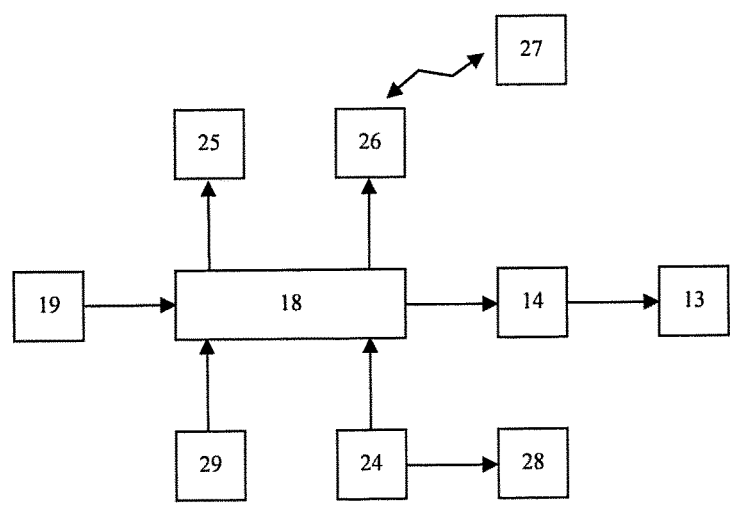
FIG. 4 shows a simplified layout of the electric circuit according to an embodiment of the invention.

FIG. 4 shows a simplified layout of the electric circuit 16 according to an embodiment of the invention.

A power source 24 in the form of a solar cell arrangement can drive the electric circuit 17. An accumulator (not shown) in the form of a rechargeable battery can be connected to the power source. The solar cell arrangement can be disposed at the outer side of the top member 3 or the bottom member 4 and be connected to the electric circuit 17 via a set of wires concealed in the window frame 2. Alternatively, the power source 24 can be designed as a power supply circuit which can be connected to the electricity network (not shown).

One or more temperature sensors 19, 20 can be arranged in or at the periphery of the window pane 1, preferably in the joint 7, 22 and/or in the sealing 12. By the term "periphery" is meant the outermost edge on the window pane 1 between the side faces 8a, 8b or the side faces 9a, 9b and up to 5 cm in on the side face 8a, 8b, 9a, 9b. By the term "at the periphery" is meant either in direct contact with the periphery or up to 17 mm therefrom. In a particular embodiment, the temperature sensor 19, 20 is provided in direct contact with the internal side face 8a, 9a and/or the external side face 8b, 9b on at least one of the glass panes 8, 9.

In a simple embodiment, the temperature sensor 19, 20 is designed as a line sensor configured to measure the temperature as seen along the whole line. By the term "line sensor" is meant a number of sensors that measure the temperature in a series of points along the entire length of the line, or a sensor which has an elongated measurement area corresponding to the length of the line, and wherein is measured a temperature dependent parameter, e.g. the resistance/capacity/inductance in a conductor or similar.

The control unit 18 can be connected to an operating panel 25 that includes a display/gauge and a number of buttons/switches disposed at the side face 2b in the window frame 2. The operating panel 25 can alternatively be hidden behind a removable cover on the window frame 2.

At least one wireless communication module 26 can be connected to the control unit 18 whereby the control unit 18 can communicate wirelessly or wired with other intelligent windows and/or an external apparatus 27. The external apparatus 27 can be a system configured to control and monitor the indoor climate in the building and/or monitor the energy consumption in the building, such as a building management system (BMS). The control system 18 can transmit the measured temperature $T_m$ and other status information to the external apparatus 27, either periodically or upon request from the external apparatus 27. The external apparatus 27 can transmit one or more control signals/requests to the control unit 18 based on which the control unit 18 can perform one or more actions and/or return one or more responses.

In a particular embodiment, the window can be configured as a master unit that communicates with a number of other windows (not shown) which can be configured as slave units. The slave units can have the same design as the master unit or include the components needed for performing the desired function or functions.

At least one temperature regulating element 28 can be arranged in or at the same joint 7, 22 as the temperature sensor 19, 20. The temperature regulating element 28 can be configured to give off heat when the element 28 is powered by the power source 24 or an external power source (not shown). In a particular embodiment, the temperature sensor 19, 20 and the temperature regulating element 28 are designed as one and the same element. This element can be connected to a multiplexer or an electrically controlled switch that may be controlled by the control unit 18. The element can hereby be connected to the control unit 18 and to the power source 24, or to an external power source possibly via a connector (not shown). Alternatively, at the inner side 9a of the innermost glass pane 9 there may be provided a temperature regulating layer (not shown) controlled by the control unit 18.

The temperature regulating element 28 and/or the temperature sensor 19, 20 can be designed as a conductor in the form of an electric conducting wire which may be a twisted wire or a straight wire, insulated or uninsulated.

One or more types of sensors 29, such as a vibration sensor, a humidity sensor or similar types of sensors, can be arranged at one or more points along the periphery of the window pane 1. A light sensor, an air pressure gauge, or other type of sensor can be arranged on or in the window frame 2, either at the inner side or the outer side. The control unit 18 can be connected to the sensors 29 via a set of wires or a bus which also can be connected to the temperature sensors 19, 20.

At least one position module (not shown) can be connected to the electric circuit and the control unit 18. The position module can be configured to determine the position of the intelligent window based on GPS coordinates or by triangulation of radio signals. At least one direction module (not shown) can be connected to the electric circuit and the control unit 18. The directional module can be configured to the compass direction of the intelligent window and can be provided as a digital compass with two or three magnetic field sensors, a GPS receiver with two or three antennas, or similar.

Figure 5:
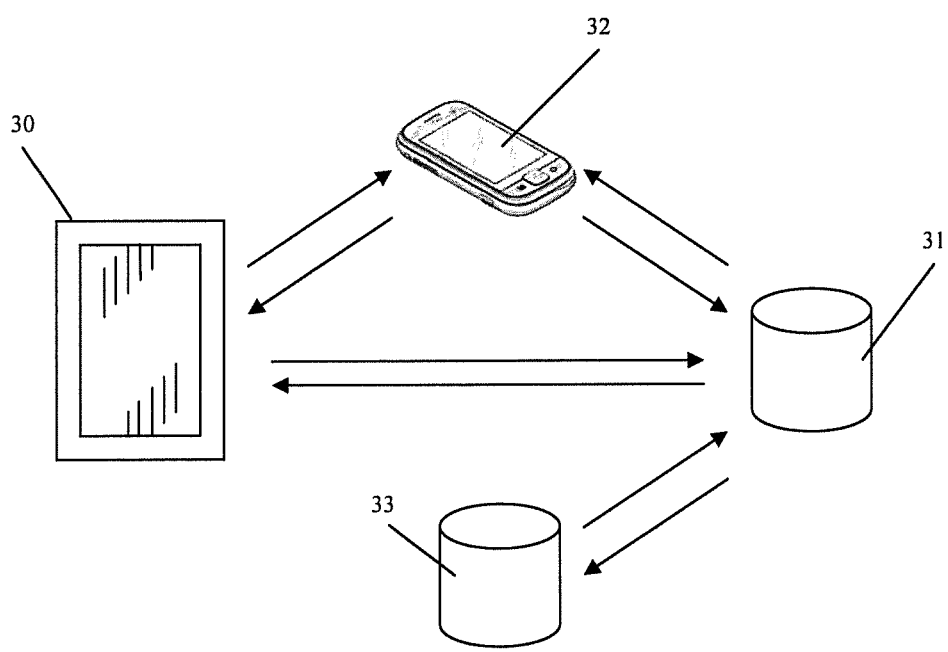
FIG. 5 shows an example embodiment of the control and programming of the window according to the invention.

FIG. 5 shows an example embodiment of the control and programming of an intelligent window. The system can include at least one intelligent window 30 as described above which can communicate directly with at least one central server 31 by means of the communication module 26 via a wireless or wired data network. The server 31 can comprise a communication module configured to communicate with the window 30 via the data network. Alternatively, the window 30 can communicate with the server 31 via at least one mobile communication unit 32 in the form of a mobile phone, a PDA, a table or another mobile communication unit. The server 31 can communicate with the communication unit 32 via a mobile data network, e.g. from a phone operator or a wired connection. The communication unit 32 can in turn communicate with the communication module 26 in the window 30 via a second wireless data network, or a wired connection. The communication module 26 can be designed as a WIFI module, a WLAN module, a Bluetooth module, an IR module, an NFC module, or another dedicated communication module which can communicate with a corresponding module in the communication unit 32.

The central server 31 can be configured to communicate with at least one other server or database 33 via a wired or wireless connection. The server/database 33 can include one or more sets or meteorological data for one or more geographical areas. The meteorological data can include information about temperature conditions, wind conditions, precipitation, air pressure, hours of sunshine or other climatic data and/or observation data. The central server 31 can be configured to receive one or more parameters from the window 30 via the communication module 26 and/or the communication unit 32. The server 31 can be configured to combine these parameters with the received meteorological data and generate a set of parameters by which the window 30 is controlled during normal operation. The set of parameters can be transmitted directly to the window 30 via the wireless connection with the window 30 or via the mobile communication unit 32.

At setup and installation of the window 30, the compass direction of the window 30 can be determined by means of the direction module in the window 30, and the position of the window 30 can be determined by means of the position module. The operating panel 25 can be used for activating and interacting with the two modules. Alternatively, the compass direction can be determined by means of an external unit and entered via the operating panel 25. The compass direction and the position of the window 30 are then transmitted to the central server 31 where the received data are stored in a memory in the server 31. The server 31 then transmits a request comprising an indication of the position of the window 30 to the server/database 33 which returns the meteorological data for the geographical area in which the window 30 is located. The server 31 then generates one or more sets of parameters which are used for controlling the functions in the window 30 during normal operation, based on the compass direction and the position of the window 30 and the meteorological data. The generated parameters are then transmitted to the window 30 and stored in a memory in the window 30. The parameters can alternatively be generated on the basis of a set of predetermined parameters stored in the memory on the server 31 and which are adapted to the position and compass direction of the window 30 and the meteorological data.

In a second embodiment, the compass direction and the position of the window 30 can be determined by means of the functions in the communication unit 32. The communication unit 32 is disposed on or close to the window 30 after which the position and the compass direction are determined by means of the communication unit 32. The data are then transmitted to the server 31 which generates a set of parameters based on which the window 30 is controlled during normal operation. The generated parameters are then transmitted back to the communication unit 32 and on to the window 30 via a wireless communication module in the communication unit 32. The position module and the direction module in the window 30 can be omitted hereby, and the communication module 26 can be adapted to communicate with the communication unit 32 by means of a local wireless data network.

In a third embodiment, control of the window 30 can be performed by means of an application configured to run on the communication unit 32. The application can be configured to communicate with the server 31 via a wireless communication module in the communication unit 32. The application can be configured to communicate with the window 30 by means of the wireless communication module 26 in the window 30. The application can be designed to control the functions in the window 30 by means of one or more graphic user interfaces. One or more of the graphic user interfaces can be designed to visually indicate (via text or graphics) one or more of the measurements performed in the window 30, e.g. the temperatures $T_m$, $T_r$, air pressure, light index or other measurement. The user can control the functions in the window 30 by means of the application and possibly perform a change in one or more of the parameters by which the window 30 is controlled. The operating panel 25 can hereby be omitted.

What is claimed is:

1. A method for regulating climate in at least one room in a building
   at least one first unit configured to supply energy from an energy source to the room;
   at least one second unit connected to the first unit and controlling the energy supply from the first unit based on at least one measured temperature, where control of the energy supply from the first unit is performed on the basis of on one or more sets of parameters;
   at least one third central unit configured to communicate with the second unit;
   wherein the method includes the following steps:
   the third unit generates the set of parameters based on one or more sets of data describing the external, ambient, meteorological data for a geographical area in which the first unit is located,
   wherein
   the geographical position of the first unit is determined and transmitted to the third unit, whereby the third central unit determines at least one set of input parameters based on the geographical position determined and
   wherein a temperature sensor in the form of a line sensor is installed along at least part of the periphery of the window pane and is configured to detect heat flow through the window irrespective of where the sunlight falls on the window by measuring temperatures detected along the line sensor in the periphery of the window pane and
   wherein the at least one second unit controls the energy supply form the first unit by including the detected temperatures in the one or more sets of parameters.

2. Method according to claim 1, wherein the compass direction of the first unit is determined and transmitted to the third unit, based on which compass direction the third unit determines the sets of parameters.

3. Method according to claim 1, wherein the second unit communicates with a mobile communication unit or local control unit which in turn communicates with the third unit.

4. Method according to claim 2, wherein the energy supply from the first unit is controlled by means of an application configured to run on the mobile communication unit.

5. Method according to claim 1, wherein the first unit is a window where one or more means regulating the amount of incoming light through the window is/are arranged in or next to the window, and that the second unit is an electric circuit measuring at least one temperature and controlling means based on the set of parameters.

6. A window including:
   at least one window pane including one or more glass panes made of a transparent material;
   at least one window frame in which the window pane is disposed;
   at least one temperature sensor arranged at the periphery of the window pane;
   an electric circuit connected to the temperature sensor and which is configured to generate a control signal when the measured temperature from the temperature sensor is equal to or greater than at least one reference temperature ($T_r$), and wherein the electric circuit is mounted in the window frame and configured such that it can be connected to means that are configured to regulate the indoor climate in a room in which the window is located;

wherein:

the temperature sensor is a line sensor measuring the temperature along a line along at least part of the periphery of the window pane, and least one second unit is installed in or connected to the window and/or the line sensor and the at least one second unit is further able to communicate with the first unit and is for controlling the energy supply from the first unit based on measured temperatures detected by the line sensor along the length thereof and where control of the energy supply from the first unit is performed on the basis of on one or more sets of parameters including heat flow through the window irrespective of where the sunlight falls on the window by measuring the temperatures detected by the line sensor along the length of the line sensor.

7. Window according to claim 6, wherein at least one first temperature sensor is arranged along a first part of the periphery of the window pane, and at least one second temperature sensor is arranged along a second part of the periphery of the window pane, wherein both temperature sensors are connected to the electric circuit.

8. Window according to claim 6, wherein the temperature sensor is disposed in a first sealing in the window pane or in a joint arranged between the window pane and the window frame.

9. Window according to claim 8, wherein the second temperature sensor is disposed in at least one second sealing.

10. Window according to claim 6, wherein the electric circuit includes a control unit configured to control an operation unit via the control signal, and that the operation unit is configured to regulate the indoor climate in the room in which the window is located.

11. Window according to claim 10, wherein the operation unit is mounted at or in the window frame and is connected to either a light transmitting layer arranged in the window pane or a sunshade connected to the window.

12. Window according to claim 6, wherein the control unit is connected with an operating panel and/or a wireless communication module which is configured to communicate with an external apparatus or at least a second window.

13. Window according to claim 6, wherein at least one other type of sensor is provided.

14. Window according to claim 13, wherein the at least one other sensor is at least one of a light sensor, an air pressure gauge or a vibration meter, and is arranged in or at the periphery of the window pane and connected to the electric circuit.

* * * * *